United States Patent
Eyole

(10) Patent No.: US 12,379,930 B2
(45) Date of Patent: Aug. 5, 2025

(54) PREDICTION USING UNIFIED PREDICTOR CIRCUITRY

(71) Applicant: Arm Limited, Cambridge (GB)

(72) Inventor: Mbou Eyole, Soham (GB)

(73) Assignee: Arm Limited, Cambridge (GB)

( * ) Notice: Subject to any disclaimer, the term of this patent is extended or adjusted under 35 U.S.C. 154(b) by 89 days.

(21) Appl. No.: 18/106,560

(22) Filed: Feb. 7, 2023

(65) Prior Publication Data

US 2024/0264838 A1     Aug. 8, 2024

(51) Int. Cl.
*G06F 9/38*     (2018.01)
*G06F 9/50*     (2006.01)
*G06N 20/00*    (2019.01)

(52) U.S. Cl.
CPC .......... *G06F 9/3806* (2013.01); *G06F 9/5044* (2013.01); *G06N 20/00* (2019.01)

(58) Field of Classification Search
CPC ...... G06F 9/3806; G06F 9/5044; G06N 20/00
USPC ........................................................ 712/239
See application file for complete search history.

(56) References Cited

U.S. PATENT DOCUMENTS

| | | | | |
|---|---|---|---|---|
| 2015/0179543 | A1* | 6/2015 | Tan ..................... | H01L 25/0657 257/713 |
| 2016/0098279 | A1* | 4/2016 | Glew .................. | G06F 9/30167 712/239 |
| 2017/0090936 | A1* | 3/2017 | Al Sheikh ........... | G06F 9/30145 |
| 2020/0133675 | A1* | 4/2020 | Gaspar ................. | G06F 9/3804 |
| 2021/0294954 | A1* | 9/2021 | Kia ..................... | G06N 7/08 |
| 2022/0091850 | A1* | 3/2022 | Ren ..................... | G06F 9/3842 |
| 2024/0028805 | A1* | 1/2024 | Sescila ................ | G06F 30/347 |

OTHER PUBLICATIONS

Gauthier et al., "Next generation reservoir computing", Nature Communications 12, 5564, Sep. 21, 2021, 8 pages.

* cited by examiner

*Primary Examiner* — Chun Kuan Lee
(74) *Attorney, Agent, or Firm* — NIXON & VANDERHYE P.C.

(57) ABSTRACT

Prediction circuitry for a data processing system comprises input circuitry to receive status inputs associated with instructions or memory access requests processed by the data processing system. Unified predictor circuitry comprises shared hardware circuitry configurable to act as a plurality of different types of predictor. The unified predictor circuitry generates, according to a unified prediction algorithm based on the status inputs and a set of predictor parameters, an array of predictions comprising different types of prediction of instruction/memory-access behaviour for the data processing system. A configuration subset of the predictor parameters is configurable to adjust a relative influence of each status input in the unified prediction algorithm used to generate the array of predictions. Output circuitry outputs, based on the plurality of types of prediction, speculative action control signals for controlling the data processing system to perform speculative actions.

20 Claims, 10 Drawing Sheets

PREDICTION USING UNIFIED PREDICTOR CIRCUITRY

BACKGROUND

Technical Field

The present technique relates to the field of data processing.

Technical Background

A data processing system may have prediction circuitry to provide a prediction used to control speculative actions. For example, a branch predictor may predict outcomes of branch instructions to allow subsequent instructions after the branch to be fetched, decoded and executed speculatively before the branch outcome is known. In another example, a prefetcher may control speculative prefetching of data or instructions into a cache, based on predictions of which addresses may in future be accessed by load/store instructions or instruction fetch requests. Other types of predictor are also possible. In general, such predictors can improve processing performance by allowing the speculative action to be performed earlier than would be possible if the action was delayed until it is known whether the action is actually required.

SUMMARY

At least some examples of the present technique provide prediction circuitry for a data processing system, the prediction circuitry comprising:
  input circuitry to receive a plurality of status inputs associated with instructions or memory access requests processed by the data processing system;
  unified predictor circuitry comprising shared hardware circuitry configurable to act as a plurality of different types of predictor, wherein the unified predictor circuitry is configured to generate, according to a unified prediction algorithm based on the plurality of status inputs and a set of predictor parameters, an array of predictions comprising a plurality of different types of prediction of instruction behaviour and/or memory access behaviour for the data processing system, the set of predictor parameters including a configuration subset of predictor parameters which are configurable to adjust a relative influence of each status input in the unified prediction algorithm used to generate the array of predictions; and
  output circuitry to output, based on the plurality of types of prediction, speculative action control signals for controlling the data processing system to perform speculative actions.

At least some examples of the present technique provide a data processing system comprising:
  processing circuitry to process instructions and issue memory access requests; and
  the prediction circuitry as described above;
  wherein the processing circuitry is configured to provide the plurality of status inputs to the prediction circuitry and to control the speculative actions based on the speculative action control signals output by the prediction circuitry.

At least some examples of the present technique provide a non-transitory computer-readable storage medium storing computer-readable code for fabrication of prediction circuitry for a data processing system, the prediction circuitry comprising:
  input circuitry to receive a plurality of status inputs associated with instructions or memory access requests processed by the data processing system;
  unified predictor circuitry comprising shared hardware circuitry configurable to act as a plurality of different types of predictor, wherein the unified predictor circuitry is configured to generate, according to a unified prediction algorithm based on the plurality of status inputs and a set of predictor parameters, an array of predictions comprising a plurality of different types of prediction of instruction behaviour and/or memory access behaviour for the data processing system, the set of predictor parameters including a configuration subset of predictor parameters which are configurable to adjust a relative influence of each status input in the unified prediction algorithm used to generate the array of predictions; and
  output circuitry to output, based on the plurality of types of prediction, speculative action control signals for controlling the data processing system to perform speculative actions.

At least some examples of the present technique provide a prediction method for a data processing system, the prediction method comprising:
  receiving a plurality of status inputs associated with instructions or memory access requests processed by the data processing system;
  using unified predictor circuitry comprising shared hardware circuitry configurable to act as a plurality of different types of predictor, generating, according to a unified prediction algorithm based on the plurality of status inputs and a set of predictor parameters, an array of predictions comprising a plurality of different types of prediction of instruction behaviour and/or memory access behaviour for the data processing system, the set of predictor parameters including a configuration subset of predictor parameters which are configurable to adjust a relative influence of each status input in the unified prediction algorithm used to generate the array of predictions; and
  outputting, based on the plurality of types of prediction, speculative action control signals for controlling the data processing system to perform speculative actions.

Further aspects, features and advantages of the present technique will be apparent from the following description of examples, which is to be read in conjunction with the accompanying drawings.

DESCRIPTION OF EXAMPLES

Figure 1:
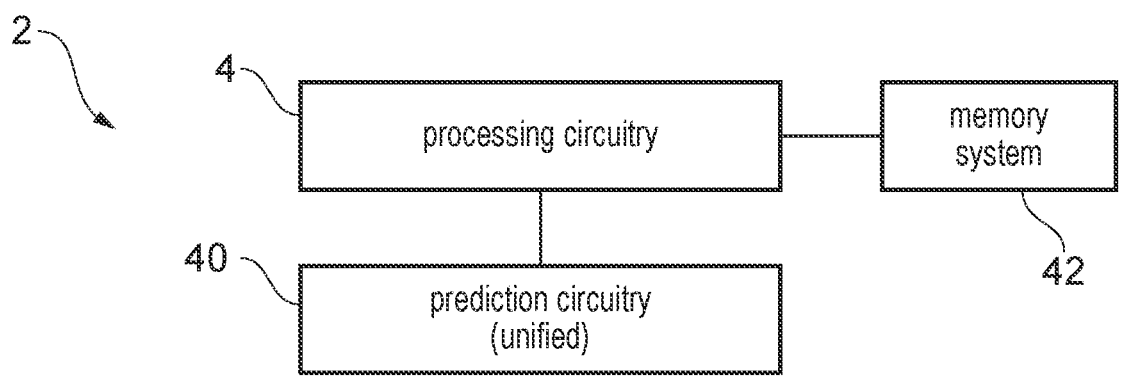
FIG. 1 illustrates an example of a data processing system.

Processors rely on predictive resources to control speculation and improve their performance as a result. However, predictors tend to be costly in terms of design and verification. There are many different types of predictors available (e.g. branch predictor, data prefetch address predictor, instruction prefetch address predictor, etc.—further examples being discussed below). A system may benefit from having multiple types of predictor, but typically each predictor is designed separately using separate bespoke hardware circuitry for that particular type of predictor, and so having many predictors can significantly increase power usage and, collectively, they require substantial portions of the circuit area dedicated to a processor design.

However, the inventor recognised that not all software workloads may benefit from the full resource provided by every type of predictor supported in a system having multiple types of predictor. Some software workloads may, for example, be extremely sensitive to branch prediction accuracy, but less sensitive to prefetch address prediction accuracy, so that they can tolerate having a less capable data prefetch address predictor, while other software workloads may be the other way round so they would benefit from a more capable data prefetch address predictor with greater prediction resources but can tolerate a less capable branch predictor. Nevertheless, a typical processing system is generally provided with each predictor having sufficient resources for handling the worst case scenario envisaged for software whose performance is sensitive to that type of predictor. This means that, in practice, for many software workloads the total collective pool of prediction resources is not fully utilised.

In the examples below, prediction circuitry is provided for a data processing system. The prediction circuitry comprises input circuitry to receive a plurality of status inputs associated with instructions or memory access requests processed by the data processing system. Unified predictor circuitry comprises shared hardware circuitry configurable to act as a plurality of different types of predictor. The unified predictor circuitry generates, according to a unified prediction algorithm based on the plurality of status inputs and a set of predictor parameters, an array of predictions comprising a plurality of different types of prediction of instruction behaviour and/or memory access behaviour for the data processing system. The set of predictor parameters include a configuration subset of predictor parameters which are configurable to adjust a relative influence of each status input in the unified prediction algorithm used to generate the array of predictions. Output circuitry outputs, based on the plurality of types of prediction, speculative action control signals for controlling the data processing system to perform speculative actions.

Hence, a unified prediction scheme is provided to provide two or more different types of prediction (e.g. branch prediction and prefetch prediction, or other examples mentioned further below). An array of predictions, comprising at least two different types of prediction of instruction behaviour and/or memory access behaviour, is generated using a unified prediction algorithm processed by shared, but reconfigurable, hardware circuitry. The unified prediction algorithm depends on a set of predictor parameters, which include at least a configuration subset of predictor parameters which are configurable to adjust the relative influence each status input has in the unified prediction algorithm used to generate the array of predictions.

By consolidating resources into unified predictor circuitry for generating multiple prediction types, and making the unified predictor circuitry configurable to adjust the way in which the status inputs influence the predictions generated, this gives flexibility for the shared hardware circuitry to be adapted to tackle various scenarios without having to instantiate multiple different predictors each capable of handling the worst case scenario envisaged. A shared instance of predictive hardware can be configured to suit the particular software workload currently being executed. For example, the settings used for the configuration subset of predictor parameters may influence the accuracy of one type of prediction relative to another—one setting may be better for one type of prediction and another setting may be better for another type of prediction. Hence, the predictor settings can be set to prioritize more demanding prediction tasks to which this current software workload's performance is more sensitive, in preference to less demanding prediction tasks to which that software workload's performance is less sensitive. As resource is consolidated into shared circuitry which can be reconfigured based on need, the total amount of predictor circuitry provided in hardware can be reduced compared to an approach which has multiple separate non-shared predictors each needing to handle the worst case scenario for that particular predictor. Another advantage of using the unified prediction algorithm is that some status inputs which might normally only be provided to a subset of types of predictor can also be available for use by other types of predictor which might not normally be provided with those status inputs. For example, data access patterns typically used by a prefetcher (but not generally made available to branch predictors) might nevertheless give clues about upcoming branch direction and so could also be useful for making branch predictions. Hence, there can be a number of advantages of consolidating multiple types of predictions into a unified prediction scheme providing as its output an array of two or more different types of predictions, based on shared reconfigurable hardware circuitry.

In some examples, the unified predictor circuitry may reallocate resources based on at least one relevance measurement indicative of relevance of the plurality of types of predictor. For example, the unified predictor circuitry may be a reconfigurable hardware circuit such as a FPGA (field programmable gate array) or CGRA (coarse grained reconfigurable array), and the resources which are reallocated may comprise logic gates or connections of the reconfigurable hardware circuit. By adjusting the configuration subset of predictor parameters, a particular logic gate or connection in the reconfigurable hardware circuit may depend on the status inputs in different ways, so as to adjust how the array of predictions depends on the prediction inputs, which can help to adjust prediction performance towards favouring improving predictions for the most relevant type of prediction. The relevance measurement can be, for example, information gathered in off-line training (e.g. captured during execution of a test workload on either the data processing system itself or another representative system having the prediction circuitry, or gathered during simulation of the test workload on a simulated data processing system emulated using simulation software). The relevance measurement may specify, for example, whether the workload is more sensitive to one type of prediction or other and may be used to select a set of values for the configuration subset of predictor parameters which has previously been found to work better for that type of workload.

The prediction circuitry may comprise dynamic prediction training hardware circuitry to dynamically adapt a training subset of the set of predictor parameters based on observed runtime behaviour of instructions and/or memory accesses. This allows the prediction circuitry, for a particular configuration of the configuration subset of predictor parameters, to adapt to the specific runtime behaviour seen in the program to increase a likelihood that the same behaviour is predicted when a similar runtime scenario is seen later. On the other hand, the configuration subset of predictor parameters may be statically configurable based on a user-defined configuration input, but the configuration subset of predictor parameters may be unchanged by training performed by the dynamic prediction training hardware circuitry based on the observed runtime behaviour.

For example, the configuration subset of predictor parameters can be used to adjust which combinations of status inputs are considered in the unified prediction algorithm, and/or the relative weights applied to particular status inputs at particular steps of the unified prediction algorithms, regardless of the current values of those status inputs, while the training subset of predictor parameters may be adapted based on runtime training to allow the predictor to learn predictions for the current software workload depending on the actual values of the status inputs (weighted or combined according to the current setting of the configuration subset of predictor parameters).

Separating the predictor parameters into a training subset more dynamically updated and a configuration subset more statically configured can help to reduce the complexity of training the prediction algorithm, compared to an approach where all parameters of the predictor can be fully trained dynamically based on runtime behaviour.

Mapping circuitry may be provided to select the configuration subset of predictor parameters from among a plurality of predefined sets of configuration predictor parameters, based on a user-defined configuration input.

For example, the predefined sets of configuration predictor parameters may be learned during offline training. The predefined sets of configuration predictor parameters may be read from memory of the data processing system, or obtained from an external storage device or network.

For example, the user-defined configuration input may comprise at least one of: a workload type indicator associated with a software workload to be processed by the data processing system; a predictor resource priority indicator indicative of relative priority between the plurality of different types of predictor (e.g. specifying whether branch prediction, prefetch prediction or some other type of prediction should be prioritised); and predictor hint information provided by at least one predictor hint instruction encountered within a software workload processed by the data processing system. For example, the predictor hint instruction could architecturally behave as a no-operation (NOP) instruction which does not change the architectural-visible state of the system, but may prime the unified predictor circuitry to hint that for a future part of the software workload, a particular setting for the configuration subset of predictor parameters would be beneficial. A software developer can instrument their program code with such hint instructions to help the hardware learn faster which predictor setting is best for that software workload.

The unified predictor circuitry may comprise reservoir computing circuitry to generate the array of predictions according to a reservoir computing method. When multiple types of predictor are consolidated into a unified prediction scheme, this may increase the complexity of the system being represented by the predictor compared to a prediction scheme designed only for one type of prediction. The relationship between the status inputs and the array of predictions may be non-linear, and so providing a fully trainable prediction model where all parameters of the predictor are dynamically trained based on runtime observations may be difficult to implement within the circuit area and power budgets available for prediction resources in a data processing system. With reservoir computing, a fixed "reservoir" is used to map the inputs to reservoir state with higher dimension, and then a readout layer is dynamically trained based on training data to read the reservoir state and map it to the desired output. This means that the complex non-linear dynamics of the system whose properties are being predicted can be represented by the reservoir which does not need a dynamic training algorithm (instead being relatively statically configured), and the training problem becomes more tractable as it is focused on the readout layer. Hence, use of reservoir computing can be particularly useful for the unified prediction circuitry to help conserve circuit area, power consumption and design complexity.

Hence, the unified predictor circuitry may comprise reservoir circuitry to map, based on the configuration subset of predictor parameters, the plurality of status inputs to intermediate state data defined in a higher-dimension feature space than a feature space used for the plurality of status inputs; and readout circuitry to process the intermediate state data to generate the array of predictions. The readout circuitry may process the intermediate state data based on a training subset of the set of predictor parameters, and the prediction circuitry comprises dynamic prediction training hardware circuitry to dynamically adapt the training subset of the set of predictor parameters based on observed runtime behaviour of instructions and/or memory accesses. On the other hand, the configuration subset of predictor parameters used by the reservoir circuitry is set independent of training provided by the dynamic prediction training hardware circuitry. Hence, most of the non-linear complexity of the system being predicted may be represented by the reservoir which does not need dynamic training hardware circuitry to be provided for adapting the reservoir's configuration subset of predictor parameters. Instead, the configuration subset of predictor parameters may be selected from among a number of predefined sets of parameters determined through offline training rather than using hardware circuitry built into the apparatus. The dynamic prediction training hardware circuitry can focus on adapting the training subset of the set of predictor parameters, to refine the prediction of the array of predictions from the intermediate state data produced by the reservoir.

In some cases, as well as supporting dynamic training of the training subset of the set of predictor parameters, the unified predictor circuitry may also support pre-seeding the training subset of the set of predictor parameters to initialize the training parameters to a previously determined set of parameter values found to be good for a particular software workload. For example, the same user-defined configuration input used to select the configuration subset of predictor parameters (e.g. the reservoir parameters) may also select a set of initial values for the training subset of the set of predictor parameters which will then further be adapted by training at runtime.

The dynamic prediction training hardware circuitry may dynamically adapt the training subset of the set of predictor parameters based on a regression method. This can be a simpler problem to solve than an attempt to train the full prediction model including the non-linear reservoir.

A variety of different regression techniques can be used for training the training subset of the set of predictor parameters used by the readout circuitry. For example, the regression method can be one of: a ridge regression method; a stochastic gradient descent method; and a neural network regression method (for example, the neural network used for the neural regression method can be a single-layer or multi-layer perceptron).

In some examples, the regression method comprises adapting the training subset of the set of predictor parameters to reduce an error between the observed runtime behaviour observed for a given set of the status inputs and the array of predictions generated by the unified predictor circuitry based on the given set of the status inputs, and the regression method is dependent on a damping parameter for controlling a rate at which the training subset of the set of predictor parameters is adapted based on the error. For example, the damping parameter may be a ridge parameter in a ridge regression method, or a learning rate (or step size) parameter in a stochastic gradient descent regression method. When multiple predictor types are unified into a single shared prediction framework, there is increased risk of multicollinearity (a phenomenon arising when two status inputs treated by the prediction model as independent variables actually have a linear relationship). Multicollinearity can increase risk of incorrect predictions because it can result in very small changes in input data causing drastic changes in prediction output. By using a damping parameter to limit how fast the model responds to changes in inputs, this can make the model more stable and reduce risk of overfitting predictions to the training examples of runtime behaviour used for training by the dynamic prediction training hardware circuitry.

The damping parameter can be a variable parameter, configured statically in a similar way to the configuration subset of predictor parameters used by the reservoir, e.g. by using offline training to investigate the most appropriate value for the damping parameter. Hence, in some examples, the damping parameter itself can be considered a member of the configuration subset of predictor parameters, which is configurable to adapt predictor configuration, but not dynamically trained based on runtime observations of instruction and/or memory access behaviour.

The reservoir circuitry can be implemented in different ways. In general, any non-linear system capable of mapping the status inputs to a higher dimension state can be used for the reservoir circuitry. Some implementations of reservoir computing may make use of physical effects such as spin-dependent magnetic effects in a spintronic system, which can be excited based on a set of inputs to produce a higher-dimension output which can then be interpreted by the readout circuitry. Hence, in some cases the reservoir circuitry may be physical reservoir computing circuitry.

However, such physical reservoir computing approaches may require specialised manufacturing techniques which may not be necessary for the rest of the data processing system, which can increase costs. For some systems it may be preferable to be able to manufacture the reservoir circuitry according to standard semiconductor processes, with the non-linear dynamics of the reservoir instead represented by logic gates and signal paths representing a set of logical or mathematical operations applied to the status inputs to generate the intermediate state in the feature space of higher-dimension.

In one example, the reservoir circuitry comprises a recurrent neural network (a neural network in which connections between nodes may create some cyclic paths where an output from a given node can affect subsequent inputs to the same node). In this case, the configuration subset of predictor parameters may comprise weights indicative of strength of connections between nodes of the recurrent neural network (e.g. a given node of the network may calculate a weighted sum of its respective inputs, and the weights may be the coefficients by which input is multiplied in the weighted sum). Recurrent neural networks can be used to represent complex non-linear systems. For a reservoir computing approach, the output layer of the recurrent neural network may have a greater number of nodes than the input layer so that the intermediate state output by the recurrent neural network is of higher dimension than the status inputs applied to the recurrent neural network.

In another example, the reservoir circuitry comprises non-linear vector autoregression circuitry to generate the intermediate state data based on a plurality of different combinations of information from the plurality of status inputs, and the configuration subset of predictor parameters are indicative of which combinations of information from the plurality of status inputs are to be used to generate the intermediate state data. Non-linear vector autoregression can implement reservoir computing with lower hardware cost than recurrent neural networks, so can provide a more tractable circuit implementation with fewer variables required to be configurable, while achieving similar results. For example, the plurality of different combinations may comprise different concatenation arrangements for concatenating respective subsets of information selected from the plurality of status inputs. Concatenation can be a simpler operation to implement in circuitry than the weighted sums of values from neural network nodes that may be required for a recurrent neural network operation.

The status inputs used as inputs to the unified prediction scheme may include current status inputs associated with current instructions or memory access requests processed by the data processing system, historical status inputs associated with previous instructions or memory access requests processed by the data processing system, or in some cases a combination of both current and historical status inputs. For example, current status inputs may include a program counter representing a current point of program flow, information on the occurrence of address collisions, an indirect branch target address for a most recent branch instruction, a load/store address for a most recent load/store instruction, information from a most recently seen hint instruction which provides prefetch or branch hint information, etc. Examples of historical status inputs may include branch direction history indicative of taken/not-taken results for a number of previously seen branch instructions, or a history of previous data/instruction read addresses or data write addresses for a number of previous load/store operations or instruction fetches. By combining a variety of status information (both current and historical) as inputs into the predictor, this supports a wide variety of different types of prediction of behaviour of instructions/memory accesses. In some cases, the status inputs may include subsets of bits from these current or historical status parameters, so it is not essential to use all bits of the program counter, load/store addresses, etc. Grouping of subsets of bits from historical status parameters can result in better packing of historical information and confer a storage density advantage over examples where these pieces of information are kept separate. From a storage perspective, it also simplifies implementing trade-offs between the historical data storage footprint of one type of predictor against another.

The plurality of types of prediction may, in some examples, comprise at least two types of prediction selected from the following list of predictions:
- a branch prediction providing a prediction of one or more predicted branch instruction properties;
- a prefetch prediction providing a prediction of one or more prefetch parameters for controlling speculative prefetching of data or instructions;
- a load-coalescing prediction providing a prediction of one or more load-coalescing parameters for controlling fusion of memory accesses to a same address;
- a load value prediction providing a prediction of a value of data to be loaded from a memory system;
- an address collision prediction providing a prediction of occurrences of address collisions between memory accesses; and
- a snoop prediction providing a prediction of whether data will be subject to a snoop coherency transaction.

It will be appreciated that these are just some examples and other types of prediction could also be consolidated into the unified prediction algorithm.

In some cases, it can be useful for the unified prediction scheme to consolidate both a branch-related prediction and a memory-access-related prediction (e.g. prefetch prediction, load-coalescing prediction, load value prediction, address collision prediction or snoop prediction).

A data processing system may comprise processing circuitry to process instructions and issue memory access requests, and the prediction circuitry (comprising the input circuitry, unified prediction circuitry and output circuitry) as described above. The processing circuitry may provide the plurality of status inputs to the prediction circuitry and control the speculative actions based on the speculative action control signals output by the prediction circuitry.

In some examples, the data processing system comprises a plurality of three-dimensionally stacked integrated circuit layers, and at least part of the processing circuitry is on a different integrated circuit layer to the prediction circuitry. One consideration when consolidating multiple predictors into a single unified prediction scheme is that this may place increased pressure on meeting circuit timings, as now the various types of prediction represented in the array of predictions generated at one part of the integrated circuit in the unified prediction scheme may need to cause signals to be disseminated to various parts of the integrated circuit, increasing average path length between the source of the predictions and the portions of the circuit at which those predictions are used to control speculative actions, compared to an approach where each type of prediction is predicted using a dedicated predictor local to the part of the circuit where the prediction would be used. While in some systems, this may not be a problem and the timings can still be met for the unified prediction scheme (even if implemented in a two-dimensional integrated circuit without three-dimensional stacking), three-dimensional stacking of integrated circuit layers can be an approach which can make it easier to meet timings, as often the size of modern integrated circuits means that implementing all the required circuitry in a single 2D layer can require longer signal path delays than the path delay that would be used in communicating between different layers of a 3D stacked circuit device. Hence, to simplify meeting timings, it can be useful to provide the prediction circuitry on one integrated circuit layer and at least part of the processing circuitry on a different integrated circuit layer in a three-dimensionally stacked system, to make it simpler to route each type of prediction to the location at which the prediction is used while meeting timings. 3D stacking also would allow for the reservoir circuitry to be physical reservoir computing circuitry, since some layers of the 3D stacked system can use a different integrated circuit technology to others.

FIG. 1 schematically illustrates an example of a data processing system 2 comprising processing circuitry 4, prediction circuitry 40 and a memory system 42. The processing circuitry 4 has a processing pipeline for processing instructions read from the memory system 42 and executing instructions to carry out processing operations (e.g. arithmetic or logical operations) and to cause data read/write requests to be sent to the memory system 42. As described further below, the memory system 42 may include one or more caches 30, 32, 8 and main memory 34. The prediction circuitry 40 is provided to predict instruction behaviour and/or memory access behaviour for the processing circuitry 4, to allow speculative actions to be performed before the actual instructional memory access behaviour for triggering those actions as being identified. This can help to improve performance because when the prediction is correct then the speculative action is initiated earlier than would otherwise be possible. If a prediction is incorrect then, for some types of prediction (e.g. branch prediction), a recovery action may be performed to reverse incorrect effects of the prediction. For other types of prediction (such as prefetcher prediction), there may be no need to perform a recovery action as if data brought into a cache by a prefetch request is not subsequently needed, this may not cause any incorrect architectural results. The processing circuitry 4 may provide various status inputs to the prediction circuitry 40 for generating the predictions and the prediction circuitry 40 may generate a number of predictions and, based on those predictions, provide speculative action control signals for triggering the performance of speculative actions at the processing circuitry 4 or the memory system 42.

Figure 2:
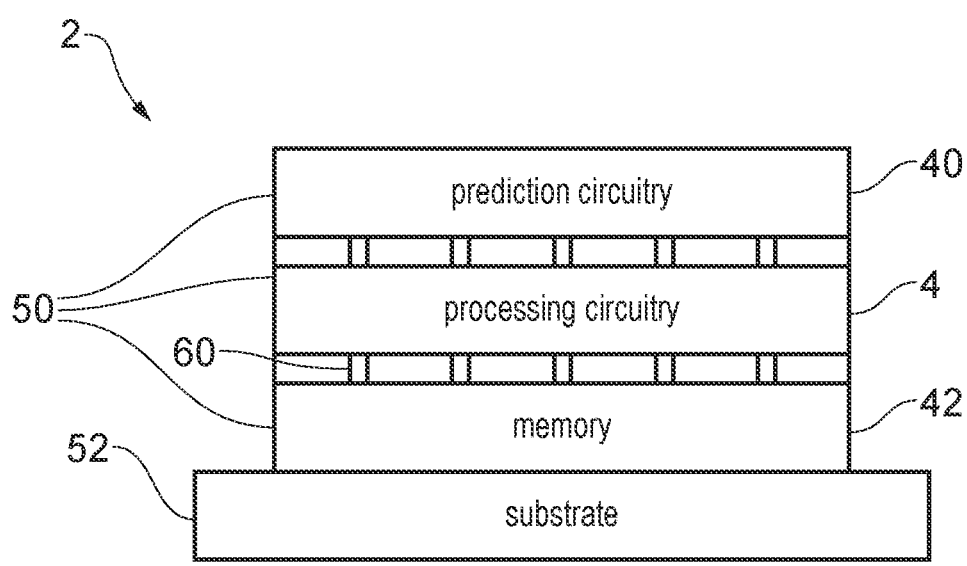
FIG. 2 illustrates an example of providing three-dimensionally stacked integrated circuit layers with prediction circuitry on a different layer to processing circuitry.

As shown in FIG. 2, in some examples the data processing system 2 may be implemented using a number of three-dimensionally stacked integrated circuit layers 50, which are stacked in the direction perpendicular to the plane of a substrate 52. In one 3D integration scheme, through silicon vias (TSVs) 60 may be used for communications between different integrated circuit layers, but other 3D integration schemes are also possible. In some cases, it can be useful for the prediction circuitry 42 be implemented on a different layer 50 to at least part of the processing circuitry 4, to allow the faster inter-layer connections provided by the TSVs to reduce signal path delays in routing the speculative action control signals from the prediction circuitry 40 to the relevant part of the processing circuitry 4 that uses those speculative action control signals. While FIG. 2 for simplicity shows an example where the prediction circuitry 40 is on one layer and the processing circuitry 4 in its entirety is on another layer, in other approaches part of the processing circuitry 4 could be on the same layer as the prediction circuitry 40 with another part of the processing circuitry 4 on a different layer. Also, while the memory system 42 is shown on a different layer to the processing circuitry 4 and prediction circuitry 40, in other examples the memory system 42 could at least partly share a layer with parts of the processing circuitry 4 or the prediction circuitry 40 (e.g. a cache could be provided on the same layer as part of the processing circuitry). Use of 3D integration can be helpful to reduce timing pressure in a system where the prediction circuitry 40 unifies a number of distinct types of prediction as discussed in the subsequent examples. While FIG. 2 shows a 3D integration using TSVs, other forms of 3D integration are also possible. Also, other examples could use an interposer to route signals between integrated circuit layers (e.g. in a 2.5D integration scheme). It is also possible to use a conventional 2D integrated circuit with a single layer to implement the system shown in FIG. 1, so the 3D stacked approach is just one example.

Figure 3:
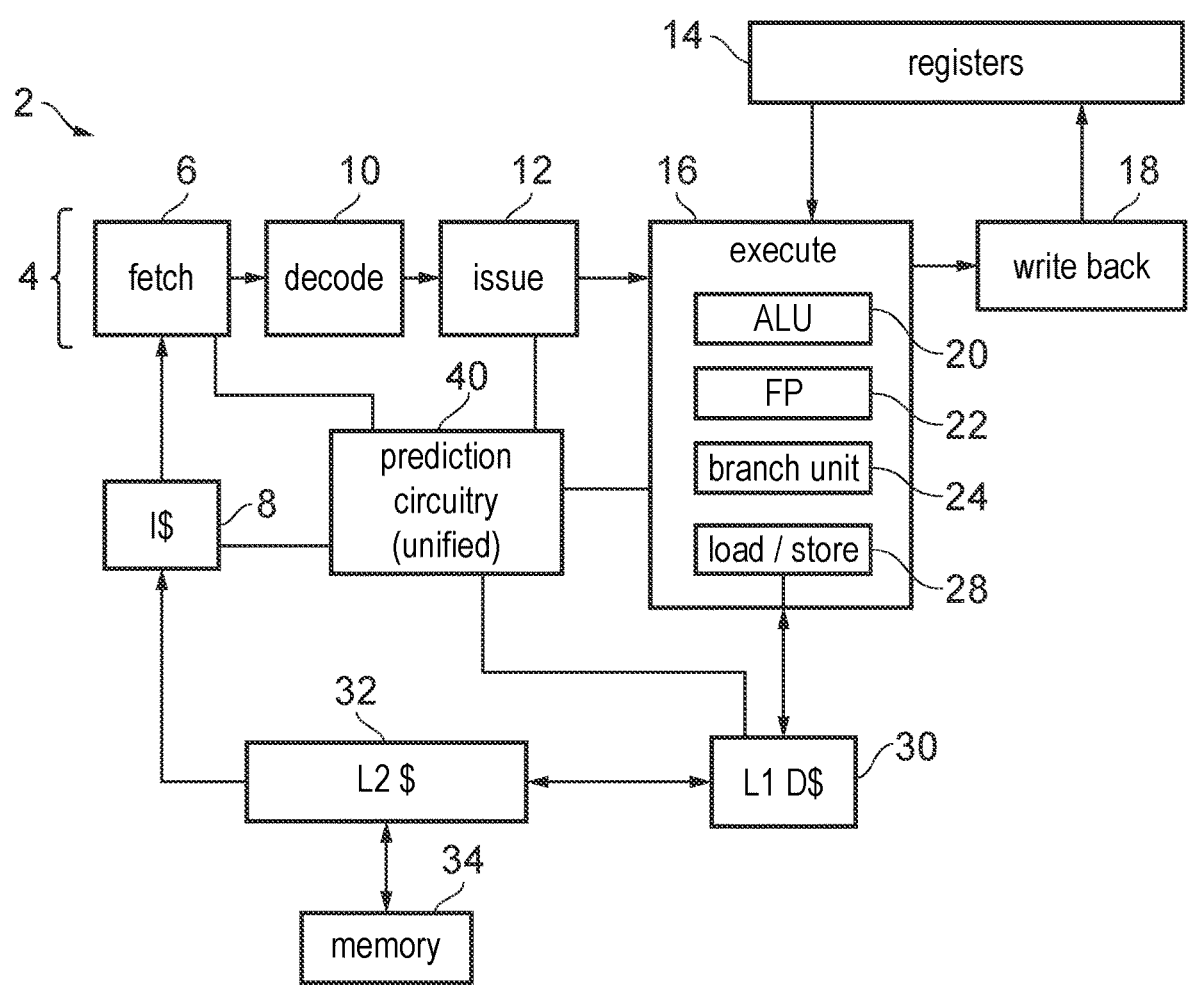
FIG. 3 illustrates an example of use of prediction circuitry to control speculative actions in a data processing system.

FIG. 3 schematically illustrates an example of the data processing apparatus 2 in more detail. The data processing apparatus has a processing pipeline (processing circuitry) 4 which includes a number of pipeline stages. In this example, the pipeline stages include a fetch stage 6 for fetching instructions from an instruction cache 8; a decode stage 10 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of a possible pipeline design, and other systems may have additional stages or a different configuration of stages. For example in an out-of-order processor an additional register renaming stage could be included for mapping architectural registers specified by program instructions or micro-operations to physical register specifiers identifying physical registers in the register file 14. In some examples, there may be a one-to-one relationship between program instructions decoded by the decode stage 10 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation.

The execute stage 16 includes a number of processing units, for executing different classes of processing operation. For example the execution units may include an arithmetic/logic unit (ALU) 20 for performing arithmetic or logical operations; a floating-point unit 22 for performing operations on floating-point values, a branch unit 24 for evaluating the outcome of branch operations and adjusting the program counter which represents the current point of execution accordingly; and a load/store unit 28 for performing load/store operations to access data in a memory system 8, 30, 32, 34. In this example the memory system include a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness, such as address translation or memory management mechanisms.

As mentioned above, the apparatus 2 has prediction circuitry 40 for predicting instruction and/or memory access behaviour used to control speculative actions in the processing system. Processors rely on predictive resources in order to perform adequate speculation and improve their performance as a result. However, predictors tend to be costly in terms of design and verification. In addition, having many predictors can significantly increase power usage and, collectively, they require substantial portions of the silicon area dedicated to a processor design. There are many predictors used within a state-of-the-art high-performance processor design. Some of these are:

1) Branch predictor (for conditional and indirect branches or dealing with control-flow hazards). Predictions of branch direction (taken/not-taken) and branch target address can be used to control speculative fetching, decoding, issuing and executing of subsequent instructions by the fetch 6, decode 10, issue 12 and execute 16 stages respectively.

2) Prefetch data address predictor (for guessing future load addresses and length of access streams). A speculative action controlled based on the prediction made by the data address predictor can be prefetching of data into one of the data caches 30, 32.

3) Load-coalescing predictor (for predicting opportunities for fusing memory accesses in order to maximise memory bandwidth). A speculative action controlled by the load-coalescing prediction can be the speculative merging of memory accesses pending in the issue stage 12 and issuing of a fused memory access to the load/store unit 28.

4) Address collision predictor (for predicting whether loads which overtake stores might end up going to the same address referenced by the stores, in which case corrective actions would need to be performed). A speculative action controlled based on the prediction of the address collision predictor can be a decision at the issue stage 12 on whether to allow the load to be issued bypassing the store.

5) Snoop predictor (for predicting whether data will be subject to a coherence transaction). A speculative action controlled based on the snoop prediction can be control of which addresses are allocated into the caches 30, 32 and what coherency states are used for those addresses.

6) Instruction prefetcher. A speculative action controlled based on the instruction address prediction provided by the instruction prefetcher can be speculative prefetching of instructions into the instruction cache 8.

etc.

In the approach discussed in this application, predictive structures can be provided in a processor that are powerful enough yet flexible and interchangeable enough to enable better management of resources dedicated to performing predictions. The prediction circuitry 40 comprises unified prediction circuitry which has shared hardware circuitry configurable to act as a plurality of different types of predictor (e.g. any of the types of predictor discussed above). The unified predictor circuitry generates, according to a unified prediction algorithm based on a set of status inputs provided by the processing circuitry 4 and a set of predictor parameters, an array of predictions comprising two or more different types of prediction of instruction behaviour and/or memory access behaviour for the data processing system. Hence, the types of prediction represented by the array of prediction may include a number of distinct types. For example, the respective predictions in the array may include at least two predictions used to control speculative actions at different circuit units of the processing circuitry (e.g. the branch prediction may be used at a fetch stage of the pipeline to control instruction fetching, the data prefetch prediction may be used at a load/store unit of the pipeline to control speculative requests for data to be prefetched to a cache, and a load-coalescing predictor could be used at an issue stage to control which loads are issued for execution). The set of predictor parameters include a configuration subset of predictor parameters which are configurable to adjust a relative influence of each status input in the unified prediction algorithm used to generate the array of predictions.

This approach has several advantages:
Consolidation of resources—resources can be automatically moved away from less demanding prediction tasks to more demanding predictions.
Predictive hardware can be flexible and tackle various scenarios and settings without having to instantiate many different predictors. A single instance of the predictive hardware can be configured to suit the software program that is currently executing.
A highly configurable datapath can accelerate many different scenarios (variable dynamics) within a common framework, thereby simplifying design and verification
By unifying predictions into a unified algorithm, one type of prediction can use information typically only available for other types of predictors to improve each predictor's accuracy (for example, data access patterns might give clues about upcoming branch direction (or future instruction fetch patterns))

In one example, we make use of an on-chip implementation of reservoir computing hardware connected directly to a CPU for the purpose of making predictions. Reservoir computing has been shown to be applicable in situations in which one wishes to learn the evolution of complex dynamical systems and make accurate predictions even when systems display seemingly chaotic behaviours. In reservoir computing, input signals are mapped to a higher dimensional internal computational space using the non-linear dynamics of a fixed system with special properties referred to as the "reservoir". Some weights are then subsequently trained in a readout stage connected to the reservoir such that the current state of the reservoir can be interpreted and mapped to the desired output.

Whilst branch prediction using TAGE (tagged geometric tables), perceptron, or other advanced predictor designs has been shown to be successful in many cases, there are still many hard-to-track sequences encountered in everyday workloads. In addition, whilst abundant hardware resources can be used to improve predictor accuracy, this form of overprovisioning can be wasteful in some scenarios, and once branch predictors are deployed in hardware circuitry, there is no way of reclaiming any excess resources when trivial situations are presented. For instance, in some cases branches might be more predictable whilst data access patterns are more difficult to track, and, in this case, it would be advantageous if the same hardware block could be tuned to devote more resources to the data access side of the prediction challenge and fewer resources to branch prediction.

Figure 4:
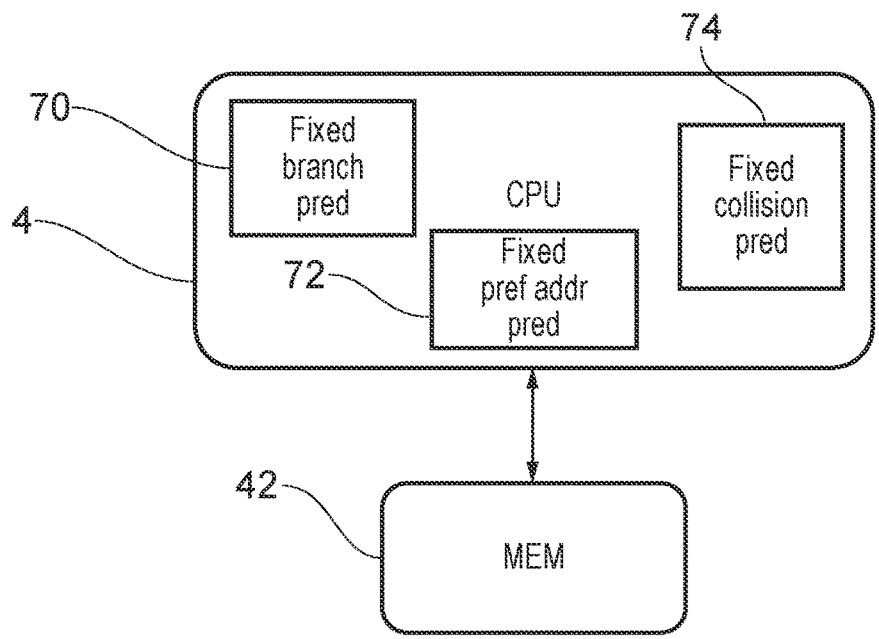
FIG. 4 illustrates, for comparison, an approach where a number of separate non-unified predictors are provided for providing different types of predictions with no sharing of circuitry between different types of predictors.
Figure 5:
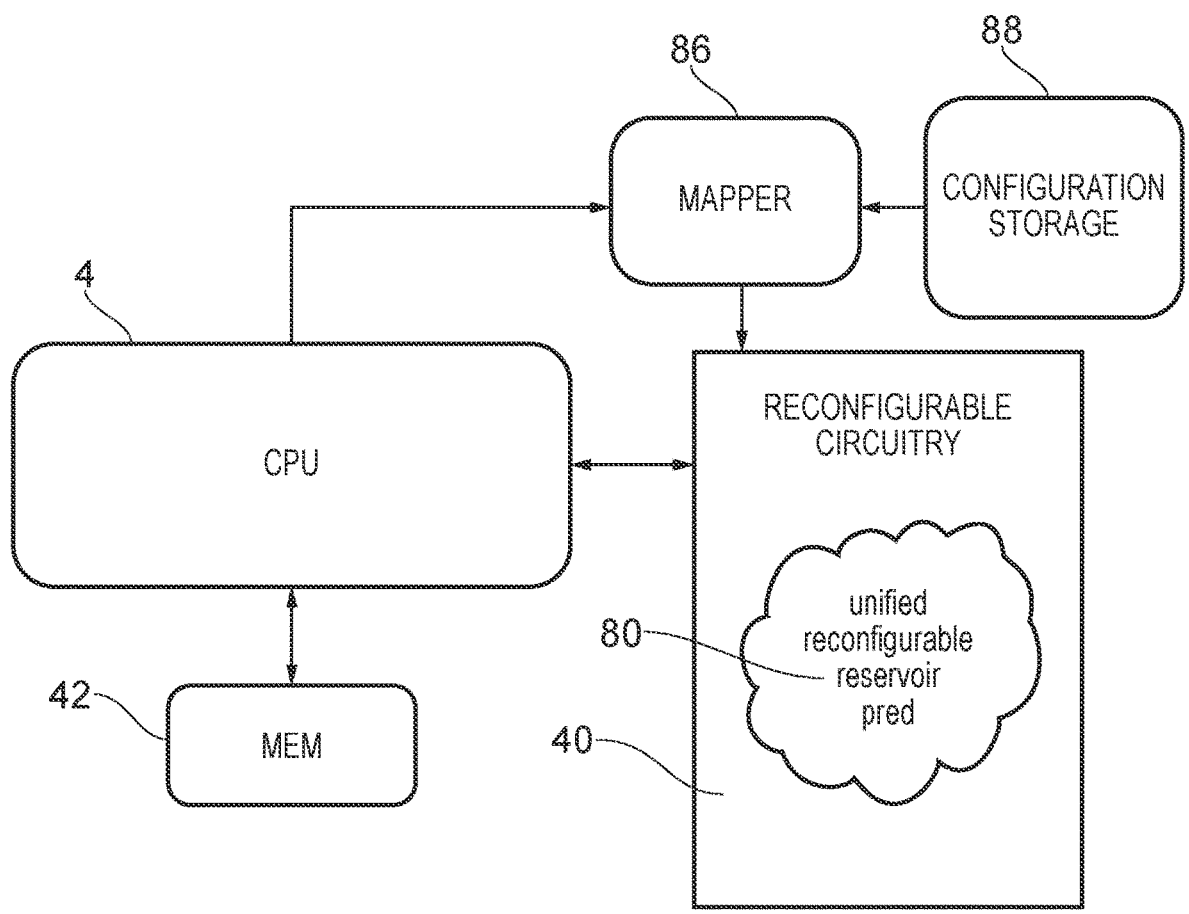
FIG. 5 illustrates use of prediction circuitry comprising reconfigurable unified predictor circuitry able to provide two or more different types of prediction based on a unified prediction algorithm.

FIGS. 4 and 5 illustrate a difference between a comparative approach (shown in FIG. 4) and the unified prediction approach (shown in FIG. 5). As shown in FIG. 4, a typical approach is to provide fixed hardware for various predictors—e.g. a branch predictor 70, prefetch address predictor 72, and address collision predictor 74. As shown in FIG. 5, this can be replaced by prediction circuitry 40 comprising unified prediction circuitry 80, which is shared between the multiple predictor types previously implemented separately and acts as a reconfigurable reservoir. Mapper circuitry 86 selects a set of configuration parameters for the reconfigurable circuitry 40 from among a number of sets of predefined parameters stored in configuration storage 88.

Figure 6:
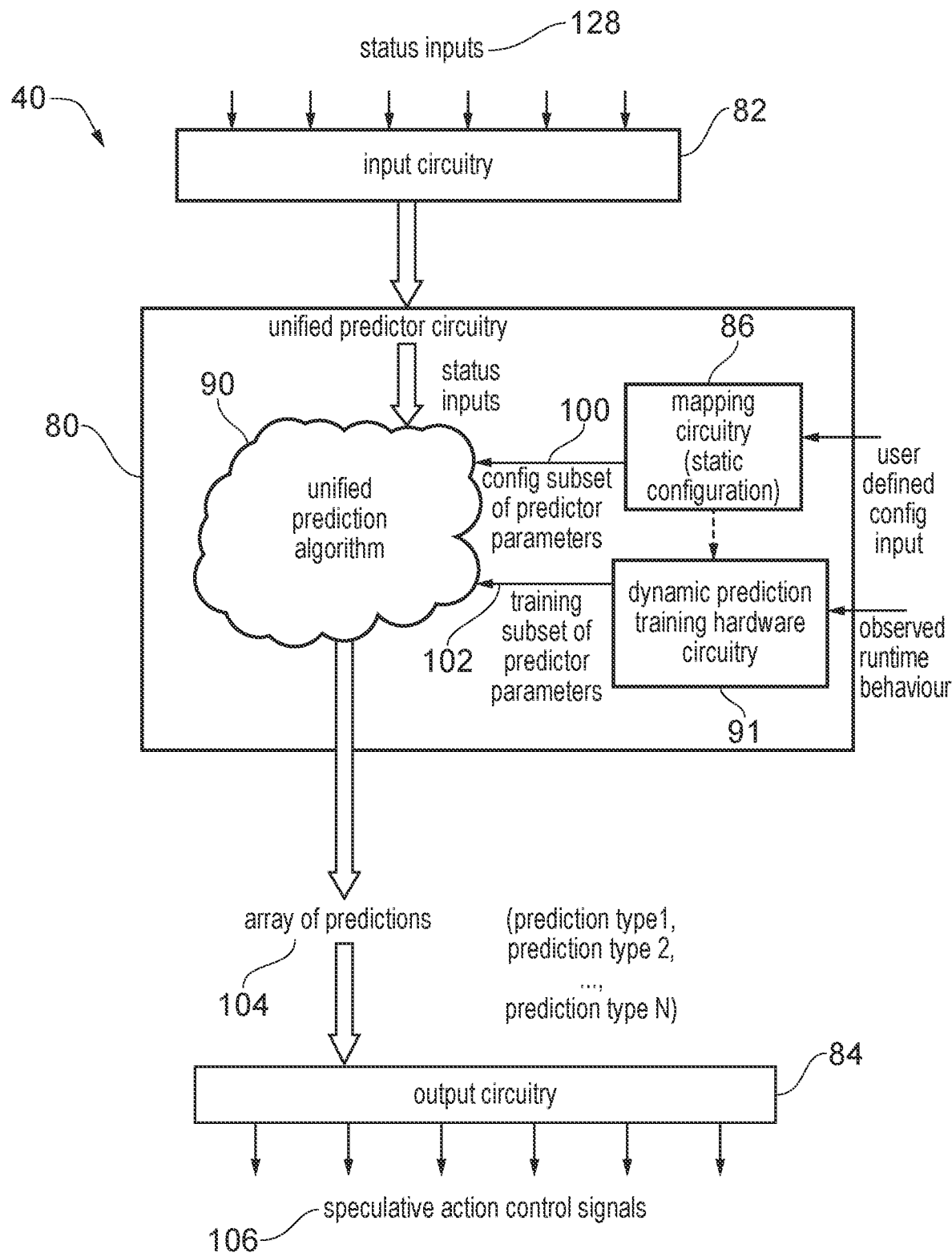
FIG. 6 illustrates the prediction circuitry comprising input circuitry, unified predictor circuitry and output circuitry.

FIG. 6 shows the prediction circuitry 4 in more detail, comprising input circuitry 82 to take various current status inputs (indicative of properties of current instructions and/or memory accesses) and/or historical status inputs (indicative of properties of previously processed instructions and/or memory accesses), and supply them to the unified prediction circuitry 80. The status inputs are processed in a unified prediction algorithm 90 based on a configuration subset 100 of predictor parameters statically configured by the mapping circuitry 86 by selecting one of a number of predefined parameter sets based on a user-defined configuration input, and a training subset 102 of predictor parameters which are dynamically learned at runtime by dynamic prediction training hardware circuitry 91, based on observed runtime behaviour. For example, the observed runtime behaviour can be used as the prediction target in a regression algorithm used to refine the training subset 102 of parameters. In some cases, as well as being dynamically trainable, the training subset 102 of predictor parameters can also be pre-seeded statically by the mapping circuitry 86 based on the user-defined configuration input. Based on the unified prediction algorithm 90, the status inputs are processed to generate an array 104 of predictions, comprising N independent types of prediction (where N is 2 or more), and output circuitry 84 maps these predictions to speculative action control signals 106 provided to various parts of the processing circuitry 4 to control speculative actions. In some cases, the speculative action control signals 106 may simply comprise the array of predictions themselves, but in other cases there could be some re-encoding of the information indicated in the array of predictions, for generating the action control signals 106.

Figure 7:
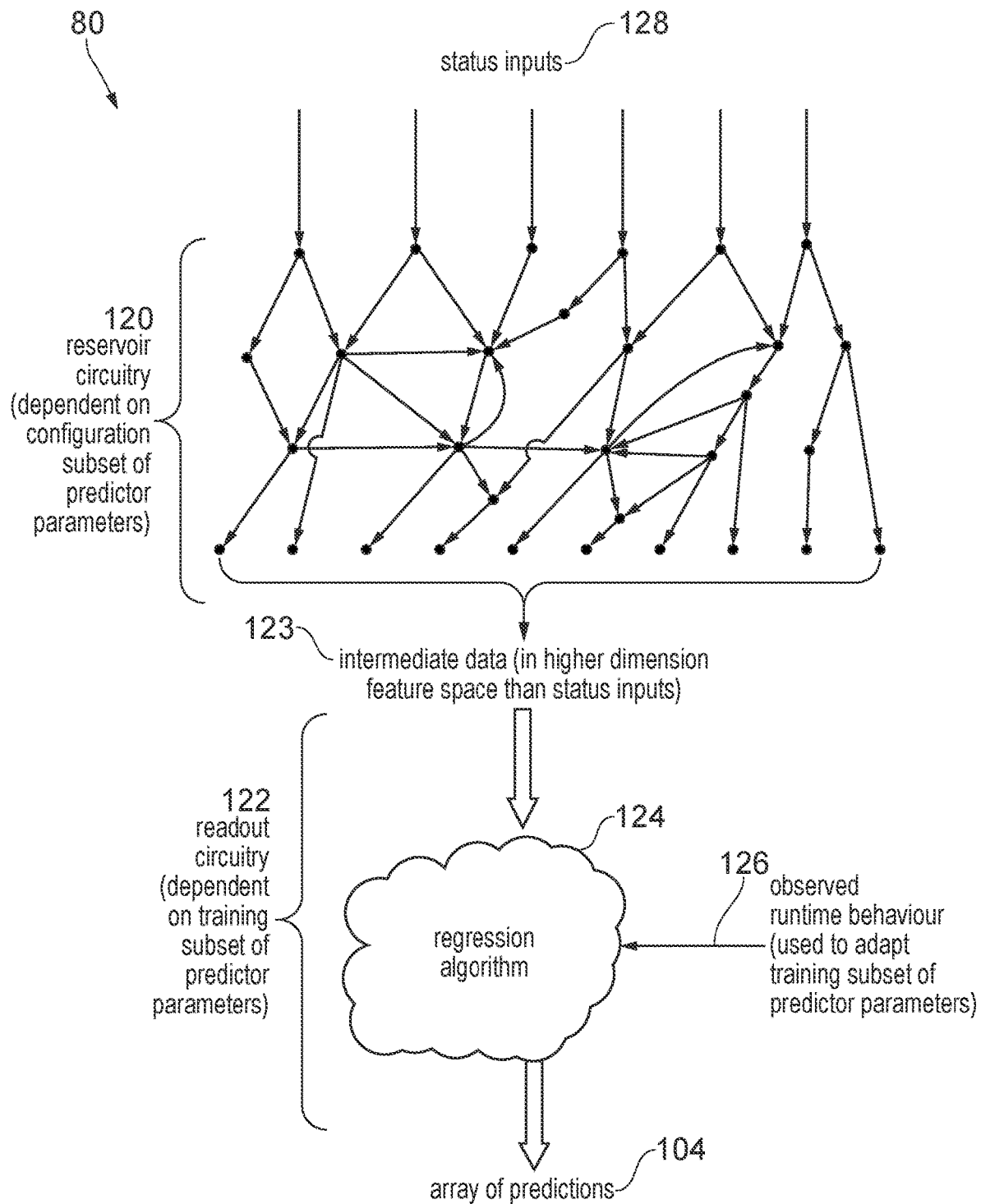
FIG. 7 illustrates use of reservoir computing for the unified prediction circuitry, where the unified prediction circuitry comprises reservoir circuitry and readout circuitry.

As shown in FIG. 7, in one example, the unified predictor circuitry 80 comprises reservoir circuitry 120 which maps the status inputs to intermediate data 123 in a higher dimension feature space than the feature space used for the inputs. For example, in FIG. 7 the reservoir 120 is represented by a recurrent neural network, which includes some "backwards" connections between nodes which create cyclic paths so that a given node may have a value which depends on previous outputs of the same node. This can create highly non-linear effects in mapping the status inputs to the intermediate data. The intermediate data 123 generated by the reservoir circuitry 120 is then processed by readout circuitry 122, which maps the intermediate data from the reservoir 120 to the array of predictions 104 based on a set of training parameters 102 (e.g. prediction coefficients or weights) which are dynamically trained by applying a regression algorithm 124 to reduce error between observed runtime behaviour 126 observed for a given set of status inputs and the prediction 104 generated by applying the prediction model represented by a current set of training parameters to the intermediate data 123 corresponding to the given set of status inputs. By repeating this using a number of training examples, the training parameters can gradually be refined (e.g. based on correcting proportional to the error between the prediction and the observed runtime behaviour for each training example) to arrive at a better prediction model.

Hence, there can be several levels of configurability for such reconfigurable reservoir predictors.

A first level, represented by the configuration subset of parameters 100, has to do with changes that can be made to the datapath and connectivity of the components in the interconnect within the reservoir 120 (these connections are the ones which give the reservoir its non-linear dynamics and configure the design space of the predictors at a coarse-granularity). A configuration subset of predictor parameters is read by the mapping circuitry 86 from configuration storage 88, and used to configure the way in which the unified processing circuitry 80 is influenced by the status inputs provided by the CPU 4. For example, if the unified reservoir comprises an FPGA or CGRA, the parameters selected by the mapping circuitry may control which connections between nodes of the FPGA or CGRA are active and which are disabled, or may control the weightings applied to the status values for generating prediction state. Different settings for the configuration subset of predictor parameters may therefore cause the array of predictions to be tuned to favour one type of predictor over another, depending on the needs of a particular software workload. For example, one setting for the parameters may be determined, in off-line training, to be better for software workloads which are more sensitive to branch prediction accuracy while another setting for the configuration subset of predictor parameters may be better for workloads which are more sensitive to prefetcher prediction accuracy. Hence, by providing a user-configurable input to the mapping circuitry (e.g. a hardware signal supplied at an external pin, information read from a memory or external device at boot time, or hint information provided by hint instructions used to instrument the software being executed to indicate to the mapper circuitry 82 what predictor configuration is considered best for a set of subsequent instructions), the mapping circuitry 86 can adapt the current predictor configuration to the current workload and reduce the likelihood of over-provisioned predictor resource not being fully used for a given workload. The preferred settings for each workload can be determined in advance by offline training based on observing the performance effects of trying different predictor settings when benchmark workloads of different types are executed. Hence, there is no need for dynamic training hardware to optimise the configuration subset of parameters at runtime based on runtime behaviour observations. Instead, a simpler mapping circuitry which simply selects from a number of predefined sets of configuration parameters based on a user-provided input can be sufficient for configuring the reservoir.

In some examples, the user-configurable input may be a relevance measurement (or set of relevance measurements) which is indicative of the relevance of the different types of prediction supported by the unified prediction circuitry. For example, the relevance measurement may indicate whether branch prediction, prefetch prediction, snoop prediction, etc. is to be prioritised, and may allow the mapper circuitry 82 to select a corresponding set of configuration parameters that has been found in offline training to give better outcomes favouring the type of prediction to be prioritised.

A second level of configurability has to do with the choice of weights within a readout layer of the reservoir. So, as software requirements change (e.g. as indicated by the hint instructions), the CPU can instruct the mapper 86 (as well as changing the configuration of the reservoir 120 on-the-fly in order to make big changes to the non-linear dynamics (e.g. prefer more accurate branch predictors to more accurate prefetchers) to initialize the weights of the readout layer 122 to certain values gleaned from previous online training sessions or offline training runs. Also, dynamic training circuitry 91 can fine-tune the weights of the readout layer 122 dynamically as the application executes and provides the reservoir with more historical data which it can subsequently use to make better predictions. By restricting the dynamic training to the weights of the readout layer 122 rather than the full predictor including the reservoir 120, this can make the training problem more tractable to implement.

Figure 8:
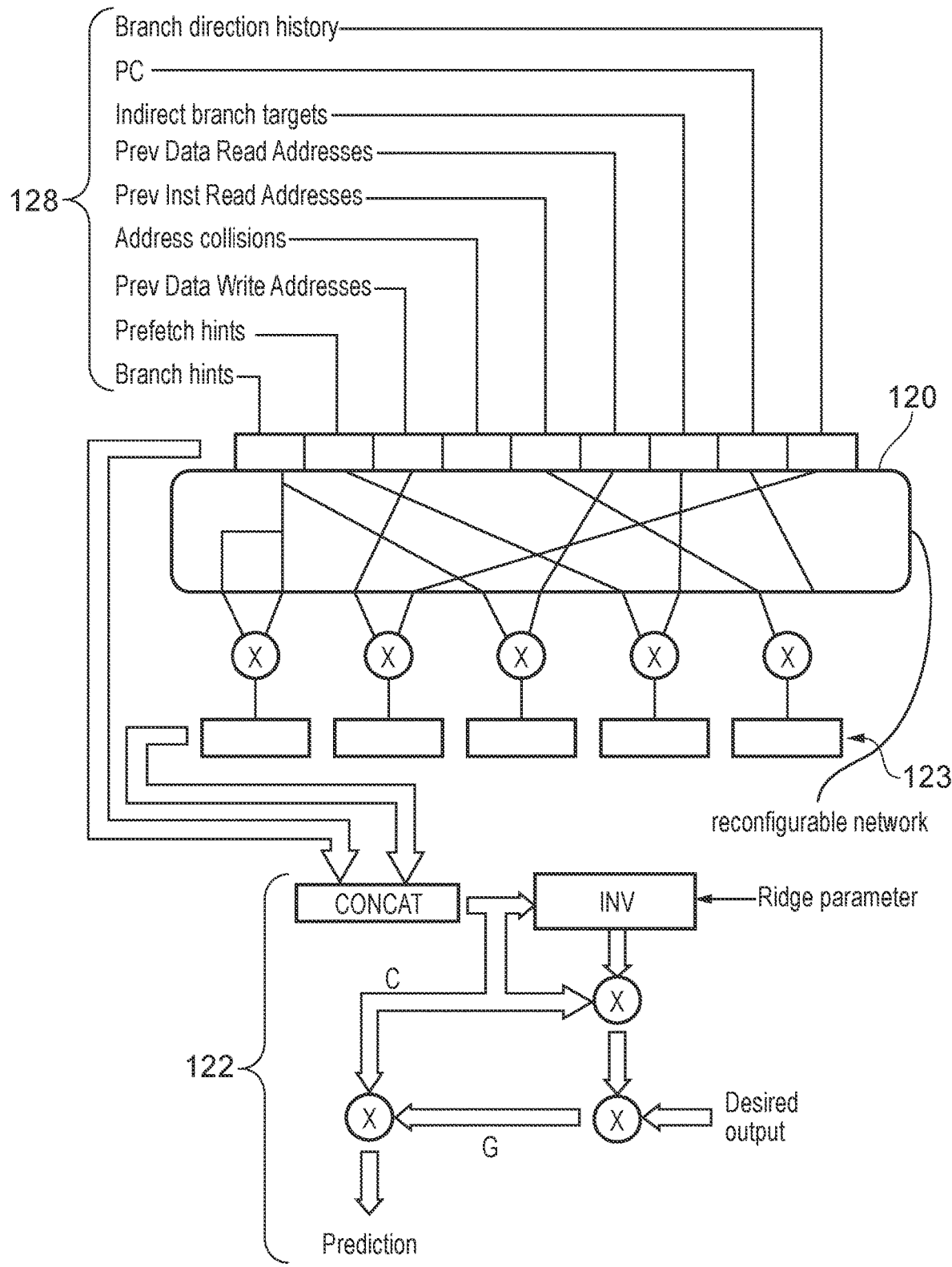
FIG. 8 illustrates an example where the readout circuitry performs dynamic training based on ridge regression.
Figure 9:
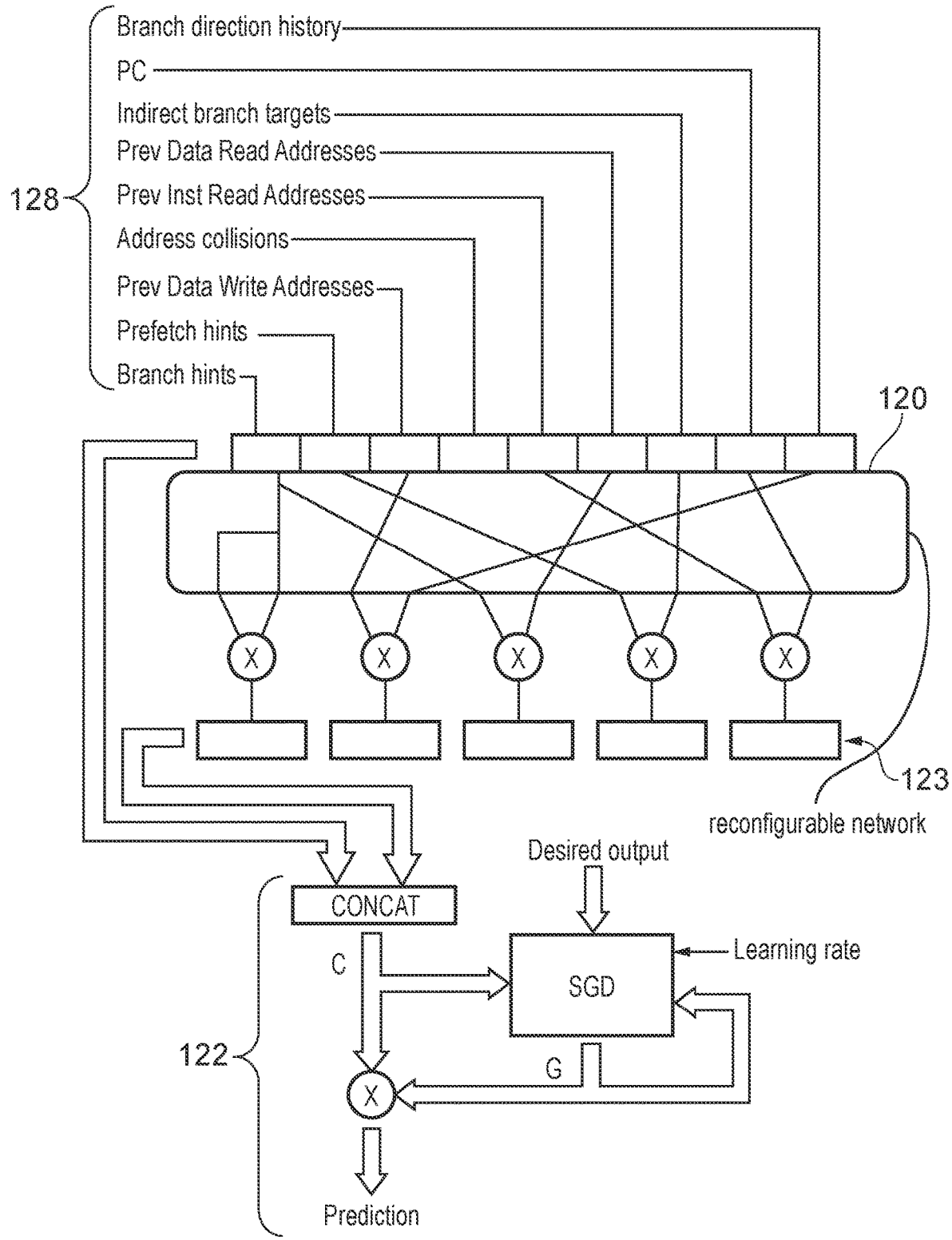
FIG. 9 illustrates another example where the readout circuitry performs dynamic training based on stochastic gradient descent regression.

In FIG. 7, the reservoir 120 is implemented using a recurrent neural network. However, another approach as shown in FIGS. 8 and 9, which is helpful for keeping the hardware complexity of the reservoir computing unit 120 low and arrive at a tractable implementation which has fewer metaparameters, is to provide a hardware embodiment of a non-linear vector autoregression engine. Non-linear vector autoregression algorithms can emulate reservoir computing but be simpler to implement in hardware. An example technique for using non-linear vector autoregression to implement reservoir computing is described in Gauthier et al., Next generation reservoir computing. Nature Communications 12, 5564 (2021). For both FIGS. 8 and 9, the non-linear vector autoregression algorithm maps the status inputs 128 to the intermediate data 123, where each item of intermediate data 123 is a combination of information from one or more of the status bits (e.g. each combination could be an arithmetic function of one or more pieces of status information, or more simply, a concatenation of selected bits from one or more pieces of status information). Hence, each item of intermediate state data 123 corresponds to a different combination of information from the status inputs, and by generating multiple such items with different combinations, the overall dimensionality of the intermediate state space can be of higher dimension than the feature space used for the status inputs. The hardware embodiment can be accelerated by laying out the datapath directly in a reconfigurable network such as an FPGA or CGRA. The connections of the reconfigurable network may be varied based on the configuration subset 100 of predictor parameters, to adjust which combinations of status inputs are provided as the intermediate state 123. This means that the relative influence of each status input on the eventual prediction can be varied, to trade off whether the unified predictor may function more efficiently for branch prediction, prefetch prediction, or another type of predictor, say (some configurations leading to better branch prediction at the expense of prefetch prediction, and other configurations giving the opposite effect, for example).

The fact that this particular reservoir computing embodiment (using non-linear vector autoregression) only needs a relatively small number of metaparameters to be set, and a few timesteps to warm-up before it can start making predictions, is advantageous because it makes it easier to use the resulting hardware component in an online learning setting (noting that CPU designs are typically highly constrained in terms of area, timing and power). Note that branch hint instructions and prefetch hint instructions can be used to seed the state of the reservoir computing hardware in order to reduce training time further. In fact, in some embodiments, it might not be necessary to issue separate branch and prefetch hint instructions, as the mere issuing of branch hint instructions, for example, might give sufficient information to the reservoir to enable it to make successful data access predictions.

In FIGS. 8 and 9, the lines shown within the reconfigurable network represent the connections which give the reservoir its non-linear dynamics. For example, one could combine the program counter value (or a subset of bits thereof) with bits from the current or previous memory access addresses. Even though the combinations between information streams are represented as "multiplications" in FIGS. 8 and 9, in practice often concatenations of bits may be sufficient to provide the reservoir behaviour so multiplying values is not essential for the reservoir circuitry 120. Note also that the resulting hardware requirements are not onerous because the reservoir can be configured to be sensitive to relatively few bits from each of the information sources shown, while still giving reasonable prediction behaviour.

In this example, the status inputs include branch direction history, program counter, indirect branch targets for one or more branches, previous data read addresses, previous instruction read addresses, address collision information, previous data write addresses, prefetch hints (information derived from prefetch hint instructions included in the software to instrument the software with explicit user-provided hints that particular prefetch patterns may be expected to follow), and branch hints (information derived from branch hint instructions included in the software to instrument the software with explicit user-provided hints that particular branch prediction patterns may be expected to follow). However, this is just one example of a set of status inputs and other examples could omit some of the status inputs shown and/or provide additional status inputs.

FIGS. 8 and 9 differ in the regression algorithm 124 used by the readout circuitry 122, which uses the regression algorithm to train, based on observed runtime behaviour, the training subset 102 of parameters representing the mapping from intermediate state 123 to the array of predictions 104.

In FIG. 8, the readout circuitry 122 implements a ridge regression method, which maps the intermediate state C, obtained as a concatenation of the various terms obtained as combinations of status inputs, to the prediction array 104 according to the relation P=G*C, where P is the prediction array and G is a weight matrix obtained by training in a ridge regression method. For example, the final prediction P is a result of a matrix multiplication between the weight matrix G representing the current training parameters 102 and C, the intermediate data 123.

To obtain the weight matrix G used as the training parameters 102, ridge regression (also known as Tikhonov regularisation) is performed as shown in the formula below:

$$G = QC^T[CC^T + \gamma I]^{-1}$$

where C is the concatenation of linear and non-linear components described as the intermediate state 123 previously, $C^T$ is the transpose of C, Q is the desired output of the predictor gleaned from previous training runs or at runtime during online training (i.e. the observed runtime behaviour), I is an identity matrix and y is a ridge parameter used as a damping parameter to control the rate at which the training parameters (weight matrix G) is adapted based on the training examples.

Tikhonov regularisation or ridge regression is used here because the problem of predicting future branch directions and prefetch addresses from the collection of inputs shown in FIG. 8 is not necessarily well-posed. That is, the solution might not be unique, and its behaviour can be highly sensitive to changes in the input data.

Note that whilst it is useful to bring multiple predictors into a unified framework, there is a danger of multicollinearity to be mitigated. This can arise if there is an approximate linear relationship among two or more supposedly independent variables. Whilst not too common in practice given the diverse nature of the information sources within a CPU and the temporal divergence of the input signals, such a linear relationship might arise, in some instances, between data read addresses and data write addresses, for example. Multicollinearity could be a problem because very small changes in the input data of the reservoir could lead to drastic changes in the prediction output. In addition to such instability, multicollinearity can lead to overfitting. This problem can be mitigated in the embodiment shown in FIG. 8 by configuring the ridge parameter (damping parameter) during offline training runs, monitoring the stability of the prediction model at runtime, and reconfiguring the ridge parameter at runtime to restore stability if necessary.

In an alternative embodiment shown in FIG. 9, some smoothness is assumed, and a stochastic gradient descent (SGD) solver can be used instead to find the weight matrix G. In a stochastic gradient descent approach, a learning rate parameter (also known as step size parameter) is provided, acting as a damping parameter which limits the rate at which the training parameters are adapted to the desired output (observed runtime behaviour). Again, the current training parameters obtained by the SGD regression can be used to map the intermediate state C from the reservoir to the prediction array 104 providing the multiple types of prediction used to control speculative actions.

Figure 10:
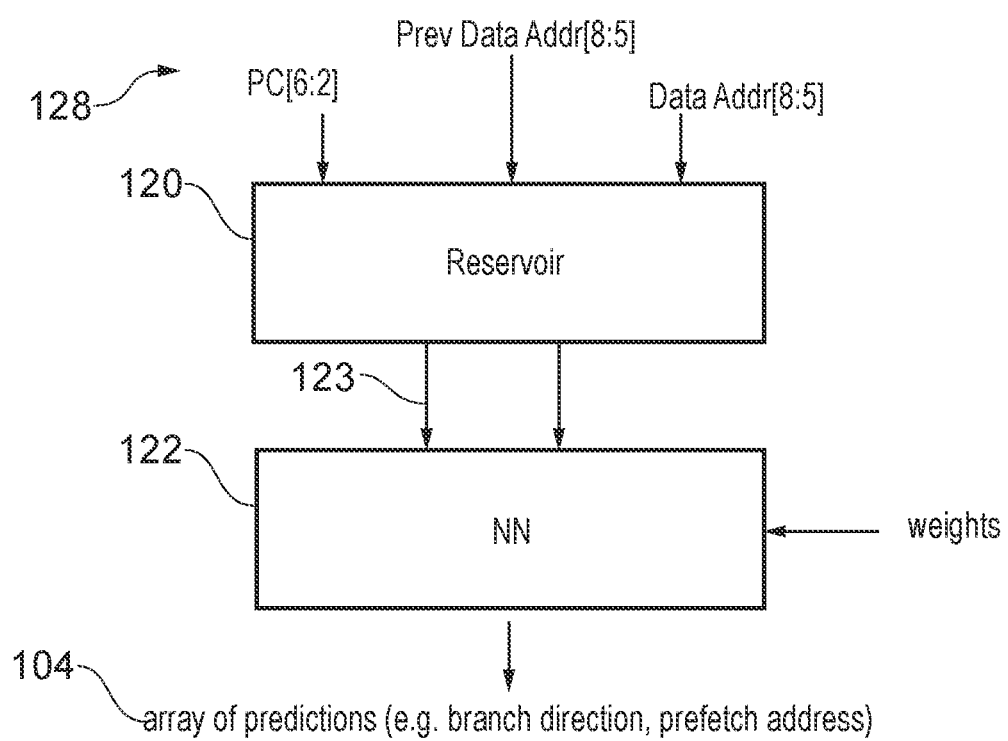
FIG. 10 illustrates an example of use of neural network regression for the dynamic training.

FIG. 10 illustrates another example, where the reservoir circuitry 120 is similar to that of FIGS. 8 and 9, but based on a simpler set of status inputs (e.g. in this case, a few bits from, respectively, the program counter, previous data address and current data address) and the reservoir circuitry 120 generates as the intermediate state 123 various concatenations or arithmetic/logical combinations of the status inputs using a non-linear vector autoregression approach. In this example, the readout circuitry 122 is a neural network (e.g. a single-layer or multi-layer perceptron), which can be trained based on training examples to adapt the weights used to predict the relationship between the intermediate state 123 and the array of predictions 104 (e.g. in this example, the array of predictions includes a prediction of branch direction (taken or not-taken) for the next branch and a prediction of a prefetch address to be used for a next prefetch request). Any known neural network training algorithm or reinforcement learning algorithm can be used. A relatively simple neural network (e.g. a single layer perceptron) can be enough to give a reasonable prediction. The majority of the complex non-linear relationships between the status inputs 128 and prediction output 104 represented by the predictor can be embodied in the reservoir 120 which is relatively statically configured, and this reduces the complexity of training the remaining readout layer 122.

Figure 11:
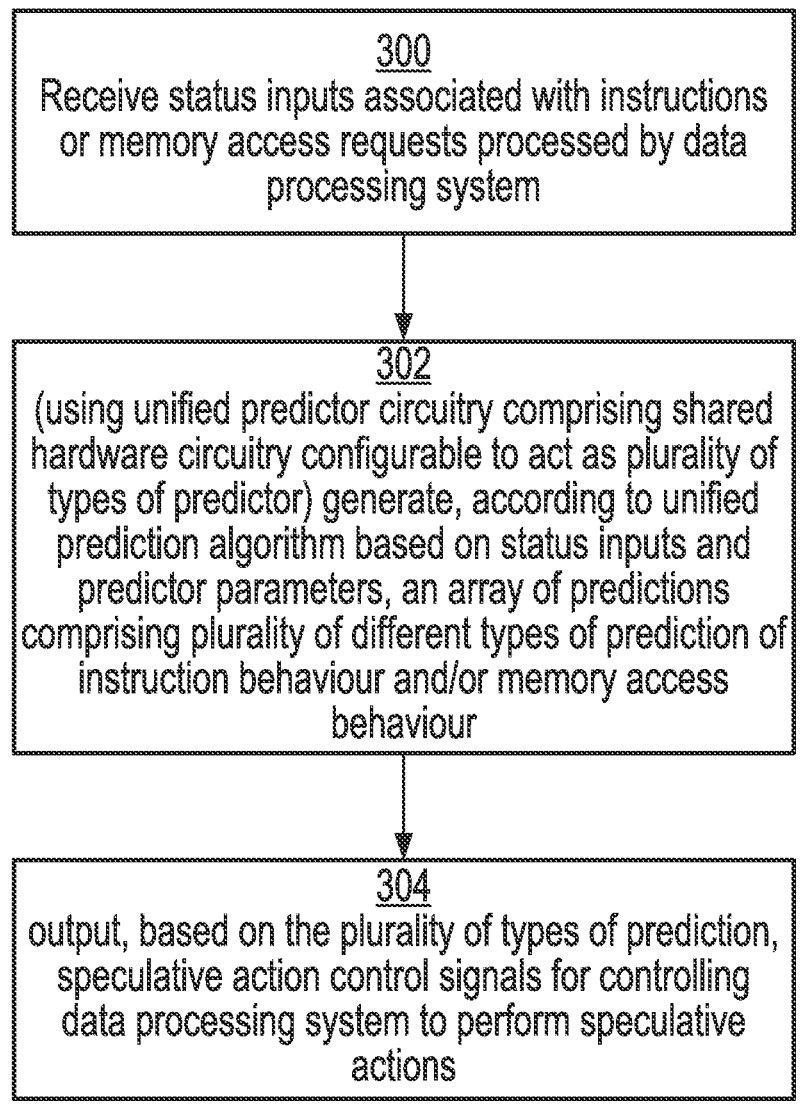
FIG. 11 illustrates a prediction method to generate an array of predictions of different types using unified predictor circuitry.

FIG. 11 illustrates a prediction method for a data processing system. At step 300, the input circuitry 82 receives status inputs 128 associated with instructions or memory access requests processed by the data processing system. At step 302, unified predictor circuitry 80 (comprising shared hardware circuitry configurable to act as two or more different types of predictor) generates, according to a unified prediction algorithm 90 based on the status inputs 128 and a set of predictor parameters, an array of predictions 104 comprising multiple different types of prediction of instruction behaviour and/or memory access behaviour for the data processing system. The set of predictor parameters include a configuration subset 100 of predictor parameters which are configurable to adjust a relative influence of each status input in the unified prediction algorithm used to generate the array of predictions. At step 304, the output circuitry 84 outputs, based on the predictions represented by the array of predictions 104, speculative action control signals 106 for controlling the data processing system to perform speculative actions, such as fetching instructions beyond a branch, speculatively prefetching data or instructions to a cache, predicting properties of load/store operations to allow a potentially memory-dependent operation to proceed before an operation on which it might depend has completed, etc.

Figure 12:
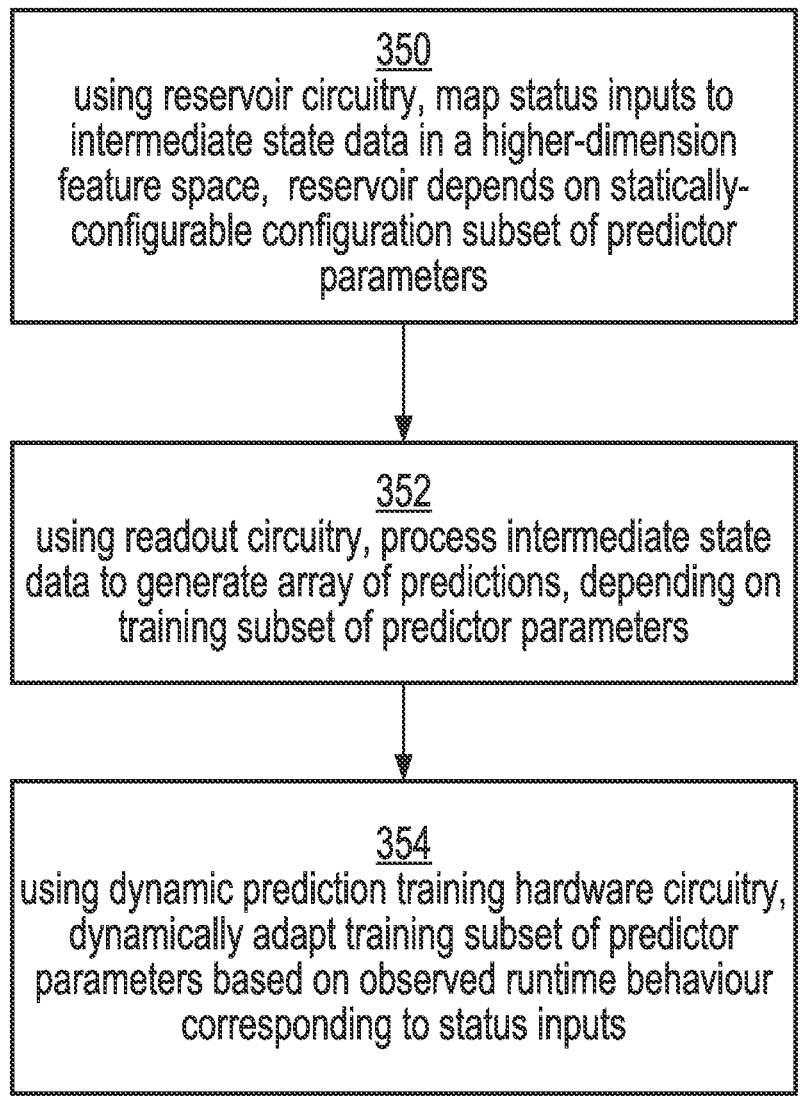
FIG. 12 illustrates a method of using reservoir computing to generate the predictions.

FIG. 12 illustrates in more detail a method for generating the prediction. At step 350, the reservoir circuitry 120 maps the status inputs 128 to intermediate state data 123 in a higher-dimension feature space than a feature space used for the status inputs 128. The reservoir's mapping functions depend on a statically-configurable configuration subset 100 of predictor parameters, selected from predefined sets of parameters stored in configuration storage 88 by the mapping circuitry 86 based on a user-defined configuration input. At step 352, the readout circuitry 122 processes the intermediate state data 123 to generate the array of predictions 104, depending on a training subset 102 of predictor parameters. At step 354, dynamic prediction training hardware circuitry 91 dynamically adapts the training subset 102 of predictor parameters based on observed runtime behaviour 126 corresponding to the status inputs 128, e.g. using a regression method such as Tikhonov regularization, a neural network or a stochastic gradient descent method.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Some examples are set out in the following clauses:

1. Prediction circuitry for a data processing system, the prediction circuitry comprising:
    input circuitry to receive a plurality of status inputs associated with instructions or memory access requests processed by the data processing system;
    unified predictor circuitry comprising shared hardware circuitry configurable to act as a plurality of different types of predictor, wherein the unified predictor circuitry is configured to generate, according to a unified prediction algorithm based on the plurality of status inputs and a set of predictor parameters, an array of predictions comprising a plurality of different types of prediction of instruction behaviour and/or memory access behaviour for the data processing system, the set of predictor parameters including a configuration subset of predictor parameters which are configurable to adjust a relative influence of each status input in the unified prediction algorithm used to generate the array of predictions; and
    output circuitry to output, based on the plurality of types of prediction, speculative action control signals for controlling the data processing system to perform speculative actions.

2. The prediction circuitry according to clause 1, in which the unified predictor circuitry is configured to reallocate resources based on at least one relevance measurement indicative of relevance of the plurality of types of predictor.

3. The prediction circuitry according to clause 1, comprising dynamic prediction training hardware circuitry to dynamically adapt a training subset of the set of predictor parameters based on observed runtime behaviour of instructions and/or memory accesses.

4. The prediction circuitry according to clause 3, wherein the configuration subset of predictor parameters is statically configurable based on a user-defined configuration input, but the configuration subset of predictor parameters is unchanged by training performed by the dynamic prediction training hardware circuitry based on the observed runtime behaviour.

5. The prediction circuitry according to any preceding clause, comprising mapping circuitry to select the configuration subset of predictor parameters from among a plurality of predefined sets of configuration predictor parameters, based on a user-defined configuration input.

6. The prediction circuitry according to clause 5, in which the user-defined configuration input comprises at least one of:
- a workload type indicator associated with a software workload to be processed by the data processing system;
- a predictor resource priority indicator indicative of relative priority between the plurality of different types of predictor; and
- predictor hint information provided by at least one predictor hint instruction encountered within a software workload processed by the data processing system.

7. The prediction circuitry according to any preceding clause, in which the unified predictor circuitry comprises reservoir computing circuitry to generate the array of predictions according to a reservoir computing method.

8. The prediction circuitry according to any preceding clause, in which the unified predictor circuitry comprises:
- reservoir circuitry to map, based on the configuration subset of predictor parameters, the plurality of status inputs to intermediate state data defined in a higher-dimension feature space than a feature space used for the plurality of status inputs; and
- readout circuitry to process the intermediate state data to generate the array of predictions.

9. The prediction circuitry according to clause 8, wherein the readout circuitry is configured to process the intermediate state data based on a training subset of the set of predictor parameters, and the prediction circuitry comprises dynamic prediction training hardware circuitry to dynamically adapt the training subset of the set of predictor parameters based on observed runtime behaviour of instructions and/or memory accesses.

10. The prediction circuitry according to clause 9, in which the configuration subset of predictor parameters used by the reservoir circuitry is independent of training provided by the dynamic prediction training hardware circuitry.

11. The prediction circuitry according to any of clauses 9 and 10, in which the dynamic prediction training hardware circuitry is configured to dynamically adapt the training subset of the set of predictor parameters based on a regression method.

12. The prediction circuitry according to clause 11, in which the regression method is one of:
- a ridge regression method;
- a stochastic gradient descent method; and
- a neural network regression method.

13. The prediction circuitry according to any of clauses 11 and 12, in which the regression method comprising adapting the training subset of the set of predictor parameters to reduce an error between the observed runtime behaviour observed for a given set of the status inputs and the array of predictions generated by the unified predictor circuitry based on the given set of the status inputs, and the regression method is dependent on a damping parameter for controlling a rate at which the training subset of the set of predictor parameters is adapted based on the error.

14. The prediction circuitry according to any of clauses 8 to 13, in which the reservoir circuitry comprises a recurrent neural network and the configuration subset of predictor parameters comprise weights indicative of strength of connections between nodes of the recurrent neural network.

15. The prediction circuitry according to any of clauses 8 to 13, in which the reservoir circuitry comprises non-linear vector autoregression circuitry to generate the intermediate state data based on a plurality of different combinations of information from the plurality of status inputs, and the configuration subset of predictor parameters are indicative of which combinations of information from the plurality of status inputs are to be used to generate the intermediate state data.

16. The prediction circuitry according to clause 15, in which the plurality of different combinations comprise different concatenation arrangements for concatenating respective subsets of information selected from the plurality of status inputs.

17. The prediction circuitry according to any preceding clause, in which the plurality of status inputs comprise at least one of:
- current status inputs associated with current instructions or memory access requests processed by the data processing system; and
- historical status inputs associated with previous instructions or memory access requests processed by the data processing system.

18. The prediction circuitry according to any preceding clause, in which the plurality of types of prediction comprise at least two types of prediction selected from the following list of predictions:
- a branch prediction providing a prediction of one or more predicted branch instruction properties;
- a prefetch prediction providing a prediction of one or more prefetch parameters for controlling speculative prefetching of data or instructions;
- a load-coalescing prediction providing a prediction of one or more load-coalescing parameters for controlling fusion of memory accesses to a same address;
- a load value prediction providing a prediction of a value of data to be loaded from a memory system;
- an address collision prediction providing a prediction of occurrences of address collisions between memory accesses; and
- a snoop prediction providing a prediction of whether data will be subject to a snoop coherency transaction.

19. A data processing system comprising:
- processing circuitry to process instructions and issue memory access requests; and
- the prediction circuitry according to any preceding clause;
- wherein the processing circuitry is configured to provide the plurality of status inputs to the prediction circuitry and to control the speculative actions based on the speculative action control signals output by the prediction circuitry.

20. The data processing system according to clause 19, in which the data processing system comprises a plurality of three-dimensionally stacked integrated circuit layers, and at least part of the processing circuitry is on a different integrated circuit layer to the prediction circuitry.

21. A non-transitory computer-readable storage medium storing computer-readable code for fabrication of prediction circuitry for a data processing system, the prediction circuitry comprising:

input circuitry to receive a plurality of status inputs associated with instructions or memory access requests processed by the data processing system;

unified predictor circuitry comprising shared hardware circuitry configurable to act as a plurality of different types of predictor, wherein the unified predictor circuitry is configured to generate, according to a unified prediction algorithm based on the plurality of status inputs and a set of predictor parameters, an array of predictions comprising a plurality of different types of prediction of instruction behaviour and/or memory access behaviour for the data processing system, the set of predictor parameters including a configuration subset of predictor parameters which are configurable to adjust a relative influence of each status input in the unified prediction algorithm used to generate the array of predictions; and output circuitry to output, based on the plurality of types of prediction, speculative action control signals for controlling the data processing system to perform speculative actions.

22. A prediction method for a data processing system, the prediction method comprising:

receiving a plurality of status inputs associated with instructions or memory access requests processed by the data processing system;

using unified predictor circuitry comprising shared hardware circuitry configurable to act as a plurality of different types of predictor, generating, according to a unified prediction algorithm based on the plurality of status inputs and a set of predictor parameters, an array of predictions comprising a plurality of different types of prediction of instruction behaviour and/or memory access behaviour for the data processing system, the set of predictor parameters including a configuration subset of predictor parameters which are configurable to adjust a relative influence of each status input in the unified prediction algorithm used to generate the array of predictions; and outputting, based on the plurality of types of prediction, speculative action control signals for controlling the data processing system to perform speculative actions.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

In the present application, lists of features preceded with the phrase "at least one of" mean that any one or more of those features can be provided either individually or in combination. For example, "at least one of: A, B and C" encompasses any of the following options: A alone (without B or C), B alone (without A or C), C alone (without A or B), A and B in combination (without C), A and C in combination (without B), B and C in combination (without A), or A, B and C in combination.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. Prediction circuitry for a data processing system, the prediction circuitry comprising:

input circuitry to receive a plurality of status inputs associated with instructions or memory access requests processed by the data processing system;

unified predictor circuitry comprising shared hardware circuitry reconfigurable to act as a plurality of different types of predictor, wherein the unified predictor circuitry is configured to generate, according to a unified prediction algorithm based on the plurality of status inputs and a set of predictor parameters, an array of predictions comprising a plurality of different types of prediction of instruction behaviour and/or memory access behaviour for the data processing system, the set of predictor parameters including a configuration subset of predictor parameters which are configurable to adjust a relative influence of each status input in the unified prediction algorithm used to generate the array of predictions; and output circuitry to output, based on the plurality of types of prediction, speculative action control signals for controlling the data processing system to perform speculative actions.

2. The prediction circuitry according to claim 1, in which the unified predictor circuitry is configured to reallocate resources based on at least one relevance measurement indicative of relevance of the plurality of types of predictor.

3. The prediction circuitry according to claim 1, comprising dynamic prediction training hardware circuitry to dynamically adapt a training subset of the set of predictor parameters based on observed runtime behaviour of instructions and/or memory accesses.

4. The prediction circuitry according to claim 3, wherein the configuration subset of predictor parameters is statically configurable based on a user-defined configuration input, but the configuration subset of predictor parameters is unchanged by training performed by the dynamic prediction training hardware circuitry based on the observed runtime behaviour.

5. The prediction circuitry according to claim 1, comprising mapping circuitry to select the configuration subset of predictor parameters from among a plurality of predefined sets of configuration predictor parameters, based on a user-defined configuration input.

6. The prediction circuitry according to claim 1, in which the unified predictor circuitry comprises reservoir computing circuitry to generate the array of predictions according to a reservoir computing method.

7. The prediction circuitry according to claim 1, in which the unified predictor circuitry comprises:

reservoir circuitry to map, based on the configuration subset of predictor parameters, the plurality of status inputs to intermediate state data defined in a higher-dimension feature space than a feature space used for the plurality of status inputs; and readout circuitry to process the intermediate state data to generate the array of predictions.

8. The prediction circuitry according to claim 7, wherein the readout circuitry is configured to process the intermediate state data based on a training subset of the set of predictor parameters, and the prediction circuitry comprises dynamic prediction training hardware circuitry to dynamically adapt the training subset of the set of predictor parameters based on observed runtime behaviour of instructions and/or memory accesses.

9. The prediction circuitry according to claim 8, in which the configuration subset of predictor parameters used by the reservoir circuitry is independent of training provided by the dynamic prediction training hardware circuitry.

10. The prediction circuitry according to claim 8, in which the dynamic prediction training hardware circuitry is configured to dynamically adapt the training subset of the set of predictor parameters based on a regression method.

11. The prediction circuitry according to claim 10, in which the regression method comprising adapting the training subset of the set of predictor parameters to reduce an error between the observed runtime behaviour observed for a given set of the status inputs and the array of predictions generated by the unified predictor circuitry based on the given set of the status inputs, and the regression method is dependent on a damping parameter for controlling a rate at which the training subset of the set of predictor parameters is adapted based on the error.

12. The prediction circuitry according to claim 7, in which the reservoir circuitry comprises a recurrent neural network and the configuration subset of predictor parameters comprise weights indicative of strength of connections between nodes of the recurrent neural network.

13. The prediction circuitry according to claim 7, in which the reservoir circuitry comprises non-linear vector autoregression circuitry to generate the intermediate state data based on a plurality of different combinations of information from the plurality of status inputs, and the configuration subset of predictor parameters are indicative of which combinations of information from the plurality of status inputs are to be used to generate the intermediate state data.

14. The prediction circuitry according to claim 13, in which the plurality of different combinations comprise different concatenation arrangements for concatenating respective subsets of information selected from the plurality of status inputs.

15. The prediction circuitry according to claim 1, in which the plurality of status inputs comprise at least one of:
  current status inputs associated with current instructions or memory access requests processed by the data processing system; and
  historical status inputs associated with previous instructions or memory access requests processed by the data processing system.

16. The prediction circuitry according to claim 1, in which the plurality of types of prediction comprise at least two types of prediction selected from the following list of predictions:
  a branch prediction providing a prediction of one or more predicted branch instruction properties;
  a prefetch prediction providing a prediction of one or more prefetch parameters for controlling speculative prefetching of data or instructions;
  a load-coalescing prediction providing a prediction of one or more load-coalescing parameters for controlling fusion of memory accesses to a same address;
  a load value prediction providing a prediction of a value of data to be loaded from a memory system;
  an address collision prediction providing a prediction of occurrences of address collisions between memory accesses; and
  a snoop prediction providing a prediction of whether data will be subject to a snoop coherency transaction.

17. A data processing system comprising:
  processing circuitry to process instructions and issue memory access requests; and
  the prediction circuitry according to claim 1;
  wherein the processing circuitry is configured to provide the plurality of status inputs to the prediction circuitry and to control the speculative actions based on the speculative action control signals output by the prediction circuitry.

18. The data processing system according to claim 17, in which the data processing system comprises a plurality of three-dimensionally stacked integrated circuit layers, and at least part of the processing circuitry is on a different integrated circuit layer to the prediction circuitry.

19. A non-transitory computer-readable storage medium storing computer-readable code for fabrication of prediction circuitry for a data processing system, the prediction circuitry comprising:
  input circuitry to receive a plurality of status inputs associated with instructions or memory access requests processed by the data processing system;
  unified predictor circuitry comprising shared hardware circuitry reconfigurable to act as a plurality of different types of predictor, wherein the unified predictor circuitry is configured to generate, according to a unified prediction algorithm based on the plurality of status inputs and a set of predictor parameters, an array of predictions comprising a plurality of different types of prediction of instruction behaviour and/or memory access behaviour for the data processing system, the set of predictor parameters including a configuration subset of predictor parameters which are configurable to adjust a relative influence of each status input in the unified prediction algorithm used to generate the array of predictions; and
  output circuitry to output, based on the plurality of types of prediction, speculative action control signals for controlling the data processing system to perform speculative actions.

20. A prediction method for a data processing system, the prediction method comprising:
  receiving a plurality of status inputs associated with instructions or memory access requests processed by the data processing system;
  using unified predictor circuitry comprising shared hardware circuitry reconfigurable to act as a plurality of different types of predictor, generating, according to a unified prediction algorithm based on the plurality of status inputs and a set of predictor parameters, an array of predictions comprising a plurality of different types of prediction of instruction behaviour and/or memory access behaviour for the data processing system, the set of predictor parameters including a configuration subset of predictor parameters which are configurable to adjust a relative influence of each status input in the unified prediction algorithm used to generate the array of predictions; and
  outputting, based on the plurality of types of prediction, speculative action control signals for controlling the data processing system to perform speculative actions.

\* \* \* \* \*